(12) United States Patent
Boutin et al.

(10) Patent No.: US 12,533,611 B2
(45) Date of Patent: Jan. 27, 2026

(54) LIQUID FILTER EQUIPPED WITH AN ANTI-LEAKAGE VALVE

(71) Applicant: VOLVO TRUCK CORPORATION, Gothenburg (SE)

(72) Inventors: Baptiste Boutin, La Tour du Pin (FR); Hervé Coste, Roche (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 624 days.

(21) Appl. No.: 17/758,843

(22) PCT Filed: Jan. 17, 2020

(86) PCT No.: PCT/EP2020/051157
§ 371 (c)(1),
(2) Date: Jul. 14, 2022

(87) PCT Pub. No.: WO2021/144032
PCT Pub. Date: Jul. 22, 2021

(65) Prior Publication Data
US 2023/0038331 A1 Feb. 9, 2023

(51) Int. Cl.
*B01D 29/15* (2006.01)
*B01D 35/153* (2006.01)
(Continued)

(52) U.S. Cl.
CPC ........... *B01D 29/15* (2013.01); *B01D 35/153* (2013.01); *F02M 37/36* (2019.01); *F02M 37/42* (2019.01);
(Continued)

(58) Field of Classification Search
CPC .................. B01D 29/15; B01D 35/153; B01D 2201/302; B01D 2201/4015;
(Continued)

(56) References Cited

U.S. PATENT DOCUMENTS 5,591,332 A 1/1997 Reid et al.
5,643,446 A 7/1997 Clausen et al.
(Continued)

FOREIGN PATENT DOCUMENTS

CN 102481497 A 5/2012
CN 102483016 A 5/2012
(Continued)

OTHER PUBLICATIONS

Japanese Office Action dated Sep. 26, 2023 in corresponding Japanese Patent Application No. 2022543168, 8 pages.
(Continued)

*Primary Examiner* — Madeline Gonzalez
(74) *Attorney, Agent, or Firm* — Jeffri A. Kaminski; Venable LLP (57) ABSTRACT

The invention relates to a liquid filter (6, 12), preferably a fuel filter, for a vehicle, said filter comprising a filter head (36) delimiting an inlet port (19) and an outlet port (21), a filter housing (30) which is to be screwed below the filter head (36) and which contains a filter element (32) centred on a central axis (X38), said filter element including a filter medium (38), a top end plate (42) and a bottom end plate (40). The filter housing (30) delimits a first volume for receiving a flow of liquid to be filtered, said first volume being delimited radially around the filter medium (38) and communicating with the inlet port (19) and a second volume for receiving a flow of filtered liquid, said second volume being delimited radially inside the filter medium (38) and communicating with the outlet port (21). The filter head (36) includes an anti-leakage valve (50) comprising a closing element (52) that is movable between a closed position in which it closes off the inlet port (19) and an open position in which the liquid can flow through the inlet port (19) and the filter (6, 12) further includes a pin (54) that is fitted on (Continued)

the filter element (32) and that is configured to penetrate inside the inlet port (19) so as to move the closing element (52) from the closed position to the open position.

13 Claims, 7 Drawing Sheets (51) Int. Cl.
*F02M 37/36* (2019.01)
*F02M 37/42* (2019.01)

(52) U.S. Cl.
CPC .................. *B01D 2201/302* (2013.01); *B01D 2201/4015* (2013.01); *B01D 2201/4061* (2013.01)

(58) Field of Classification Search
CPC ...... B01D 2201/4061; B01D 2201/301; B01D 2201/4053; F02M 37/36; F02M 37/42; F02M 37/48
USPC ........ 210/232, 440–444, 455, 117, 121, 123, 210/136, 235
See application file for complete search history.

(56) References Cited

U.S. PATENT DOCUMENTS

| | | | |
|---|---|---|---|
| 5,698,093 A | 12/1997 | Pyle et al. | |
| 6,053,334 A | 4/2000 | Popoff et al. | |
| 6,171,491 B1 | 1/2001 | Popoff et al. | |
| 6,706,181 B1 | 3/2004 | Baumann et al. | |
| 8,741,138 B2 | 6/2014 | Oelschlaegel | |
| 2009/0230048 A1 | 9/2009 | Braunheim | |
| 2011/0259808 A1 | 10/2011 | Oelschlaegel | |
| 2015/0273369 A1 | 10/2015 | Le Ven et al. | |
| 2016/0317955 A1 | 11/2016 | Jokschas et al. | |
| 2017/0197162 A1* | 7/2017 | Abdalla | ............... B01D 36/003 |
| 2019/0030470 A1 | 1/2019 | Straussberger et al. | |

FOREIGN PATENT DOCUMENTS

| | | |
|---|---|---|
| CN | 110772873 A | 2/2020 |
| EP | 2029885 B1 | 3/2014 |
| JP | S5390125 U | 7/1978 |
| JP | S5552551 U | 4/1980 |
| JP | S6153564 U | 4/1986 |
| JP | H09510518 A | 10/1997 |
| JP | 2004060597 A | 2/2004 |
| WO | 2007144288 A1 | 12/2007 |
| WO | 2011055149 A2 | 5/2011 |
| WO | 2013162570 A1 | 10/2013 |
| WO | WO-2016106170 A2 * | 6/2016 ............. B01D 35/14 |
| WO | 2017151481 A1 | 9/2017 |

OTHER PUBLICATIONS

European Communication pursuant to Article 94(3) EPC dated Feb. 11, 2025 in corresponding European Patent Application No. 20701301.2, 7 pages.

European Communication pursuant to Article 94(3) EPC dated Aug. 27, 2024 in corresponding European Patent Application No. 20701301.2, 5 pages.

European Communication pursuant to Article 94(3) EPC dated Nov. 7, 2023 in corresponding European Patent Application No. 20701301.2, 5 pages.

International Search Report and Written Opinion dated Aug. 10, 2020 in corresponding International PCT Application No. PCT/EP2020/051157, 9 pages.

Chinese Office Action dated Jul. 19, 2025 in corresponding Chinese Patent Application No. 202080093536.6, 16 pages.

* cited by examiner

LIQUID FILTER EQUIPPED WITH AN ANTI-LEAKAGE VALVE

CROSS-REFERENCE TO RELATED APPLICATIONS

This application is a U.S. National Stage application of PCT/EP2020/051157, filed Jan. 17, 2020, 2020 and published on Jul. 22, 2021, as WO 2021/144032 A1, all of which is hereby incorporated by reference in its entirety.

TECHNICAL FIELD

The invention relates to a liquid filter, typically a fuel filter, equipped with an anti-leakage valve. The invention applies mainly to fuel filtration, but one could also imagine using the same principle in an oil circuit.

The invention can be applied in heavy-duty vehicles, such as trucks, buses and construction equipment. Although the invention will be described with respect to a truck, the invention is not restricted to this particular vehicle, but may also be used in other vehicles such as passenger cars and more generally to any vehicle comprising an internal combustion engine.

BACKGROUND

Liquid filters are commonly provided in vehicles to remove contaminants from said liquid, which can be fuel or oil for example.

A conventional filter element of a liquid filter comprises a filter medium of tubular shape, at the ends of which are arranged two end plates sealingly mounted on the axial ends of the medium. Usually, the top plate includes a central opening that is in fluid communication with the internal volume of the medium. The filter element is received inside a filter housing, generally made of aluminium, that is to be attached below a filter head (also known as "casting"), the filter head comprising an inlet port and an outlet port.

Thus, a liquid to be filtered flows through the filter head inlet, through the filter medium, and then the filtered liquid can exit the filter element by the top plate central opening and, ultimately, flows through the filter head outlet.

Because the filter medium progressively gets clogged, the filter element needs to be periodically changed so that it remains effective. To that end, the filter housing is dismounted from the casting, the old filter element is removed, a new filter element is inserted in the filter housing and the latter is mounted back on the casting.

Today, there is a need to close the fuel inlet when removing the housing from the filter head, so as to avoid that fuel drops on the operator during maintenance work. In addition, there is also a need to prevent the engine from running if there is no filter element or if the filter element is not appropriate, which is commonly known as a "No Filter, No Run" function.

In this respect, EP 2 029 885 B1 disclose a fuel filter in which the filter element includes a pin which is arranged to close off a return line to the fuel tank when the filter element is properly inserted into the filter housing. Accordingly, with missing closure element and/or missing filter element, the return line is open, so that fuel supplied through the inlet into the filter housing preferably flows off through the return line and, for example, flows back into the fuel tank. In this case, no, or not enough, fuel is supplied. Subsequently, the internal combustion engine cannot be started.

However, such document does not disclose any solution to prevent fuel from splashing on the floor when removing the filter housing from the casting during maintenance work.

U.S. Pat. No. 5,698,093 disclose a fuel filter equipped with a valve system for closing off the fuel inlet when the housing containing the filter element is unattached from the casting. The valve system includes a plurality of valve stems which are pushed up by the filter element when the latter is properly introduced, involving the opening of the inlet passage for unfiltered fuel inside the housing and which move down with gravity when the filter element is removed, involving the closing of the inlet passage.

This publication discloses a solution to prevent the engine from running when the filter element is missing. However, it does not tackle the case where the filter element, which is introduced inside the housing, is not the appropriate one.

U.S. Pat. No. 5,591,332 discloses a fluid filtering assembly in which the housing includes a cylindrical neck (134) which protrudes upward from the centre of the cap (124) and in which when the filter housing is assembled to the casting, the neck (134) forces up a piston (18) and exposes inlet openings (76). A cylindrical protrusion (139) extends downward from the bottom of the cap (124) around a central return hole (138). When the filter housing (60) is removed from the casting (10), a piston return spring (22) pushes the piston (18) downward, resulting in the piston filter heading the radial openings (76) to stop flow of fluid.

The fluid filtering assembly that is disclosed in this publication does not have a "No filter No run" function because it can work even though no filter medium would be arranged inside the filter housing.

U.S. Pat. No. 6,171,491 B1 discloses a filter wherein a free end (224) of an actuating projection (222) is positioned to engage a valve element (196) and move it away from an opening (198) to enable fluid to flow through opening (198) from the central fuel chamber (212) when the filter element (98) is engaged to the head. This enables the central fuel chamber of the element to be in connection with the outlet (102) of the head.

SUMMARY

A goal of the invention is to provide a mechanism to close off the fuel inlet when the filter housing is unscrewed from the filter head and to avoid fuel dripping onto the operator. Another goal is to use the same mechanism to achieve a "No filter No run" function, that is being capable of detecting when there is no filter element inside the filter housing or when the filter element which is inside the filter housing is not the appropriate one.

To this end, the invention concerns a liquid filter, preferably a fuel filter, for a vehicle, said filter comprising:
  a filter head delimiting an inlet port and an outlet port;
  a filter housing which is to be screwed below the filter head and which contains a filter element centred on a central axis, said filter element including a filter medium, a top end plate and a bottom end plate,
wherein the filter housing delimits a first volume for receiving a flow of liquid to be filtered, said first volume being delimited radially around the filter medium and communicating with the inlet port and a second volume for receiving a flow of filtered liquid, said second volume being delimited radially inside the filter medium and communicating with the outlet port.

According to the invention, the filter head includes an anti-leakage valve comprising a closing element that is movable between a closed position in which it closes off the inlet port and an open position in which the liquid can flow through the inlet port and the filter further includes a pin that is fitted on the filter element and that is configured to penetrate inside the inlet port so as to move the closing element from the closed position to the open position.

By the terms "fitted on the filter element", it is to be understood that the pin can be either attached to the filter element or integral with the filter element, in particular integral with the top plate.

Thanks to the invention, the inlet port is automatically closed when there is no filter element, because the closing element is by default closing the inlet port. Accordingly, if there is no filter element, then no fuel will flow through the inlet port and the liquid filtering device will not be supplied with fuel. The engine will be able to start. However, it will automatically stop after a short time period due to lack of fuel supply. The same defect could be observed if the filter element that is in the system is not designed for this specific application (i.e. if the filter element is not provided with a pin). This is called "No filter No run".

According to further aspects of the invention, which are advantageous but not compulsory, the liquid filter of the invention can include one or more of the following features, considered solely or in combination:

The filter head further includes indexing means for guiding the pin towards the inlet port when screwing the filter housing to the filter head, until the pin reaches a configuration in which it is axially aligned with the first port.

Accordingly, when the filter head is screwed on the filter housing to reach a mounted configuration, the indexing means cooperate with the pin to obtain said configuration in which the pin is axially aligned with the first port. This means that the pin is first turning around the central axis and then reaches said configuration, in which it stops rotating and in which it penetrates axially inside the inlet port as the filter housing is kept being screwed on the filter head. When dismounting the filter housing, the closing element moves in closed position well before the filter housing is completely dismounted. This enables to avoid liquid dripping when changing the filter element. In addition, and thanks to this arrangement, there is also no need to bother about the orientation of the pin with respect to the filter head. The indexing means maintain the pin in the (aligned) configuration when screwing the filter housing below the filter housing. The indexation or alignment of the pin and the inlet port is made automatically.

The filter element is fixed in rotation with the filter housing and the pin is part of a ring that is rotatably mounted on the top end plate of the filter element.

The filter element is movable in rotation with respect to the filter housing and the pin is part of the top end plate of the filter element.

The pin is arranged eccentrically with respect to the central axis.

The pin is arranged at the centre of the top end plate.

The pin extends axially upwards.

The closing element is a ball or a plunger.

This enables the liquid to easily circulate in the open position of the closing element. The interruption of the liquid communication in the absence of the pin is also realized in a reliable way since a ball or a plunger has a simple geometry and can be easily moved.

The filter head delimits an inlet channel arranged upstream of the inlet port, another outlet port and a bypass extending between the inlet channel and said other outlet port.

The closing element is arranged so that it closes off the bypass in the open position and so that the bypass remains open as long as the closing element is in closed position.

Accordingly, when no filter cartridge is inside the filter housing, no fuel flows through the inlet port of the liquid filter because all of the fuel flows through the bypass directly to the other outlet port and back to the fuel tank.

The filter element can be rotated inside the filter housing between a first configuration in which it is held axially within the filter housing and a second configuration in which it can be axially removed from the filter housing.

The filter element is attached to the filter housing using a bayonet mounting system.

The invention also concerns a vehicle including a liquid filter as described above. Preferably, the outlet port is connected to the internal combustion engine of the vehicle and, if any, said other outlet port is connected to the fuel tank of the vehicle.

Further advantages and advantageous features of the invention are disclosed in the following description.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

In the following detailed description of the figures defined above, the same elements or the elements that are fulfilling identical functions may retain the same references so as to simplify the understanding of the invention.

Figure 1:
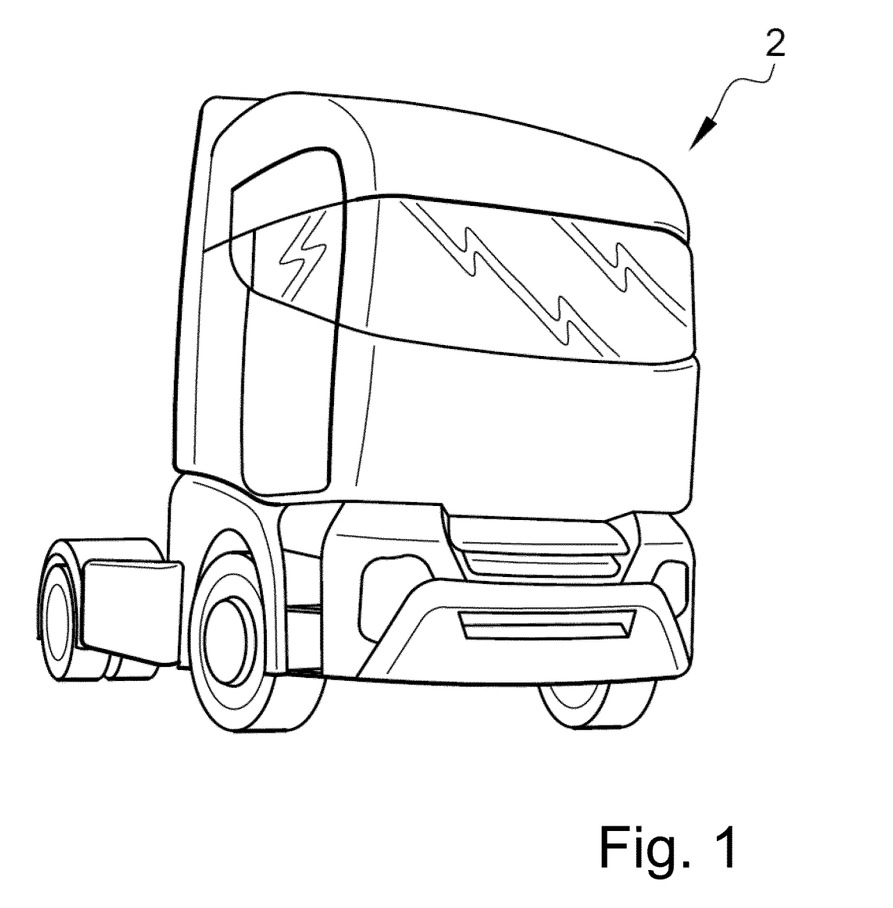
FIG. 1 is a perspective view of a vehicle, in particular a truck, comprising an internal combustion engine arrangement and at least one fuel filter according to the invention.

FIG. 1 shows a vehicle 2, in particular a truck. This vehicle 2 includes an internal combustion engine, of which only the injection system 20 is shown in the figures, in particular on FIG. 2. As shown on FIG. 2, the fuel circuit includes a fuel tank 4, a pre-filter 6 (optional), a main filter 12 and a low-pressure pump 10.

Figure 2:
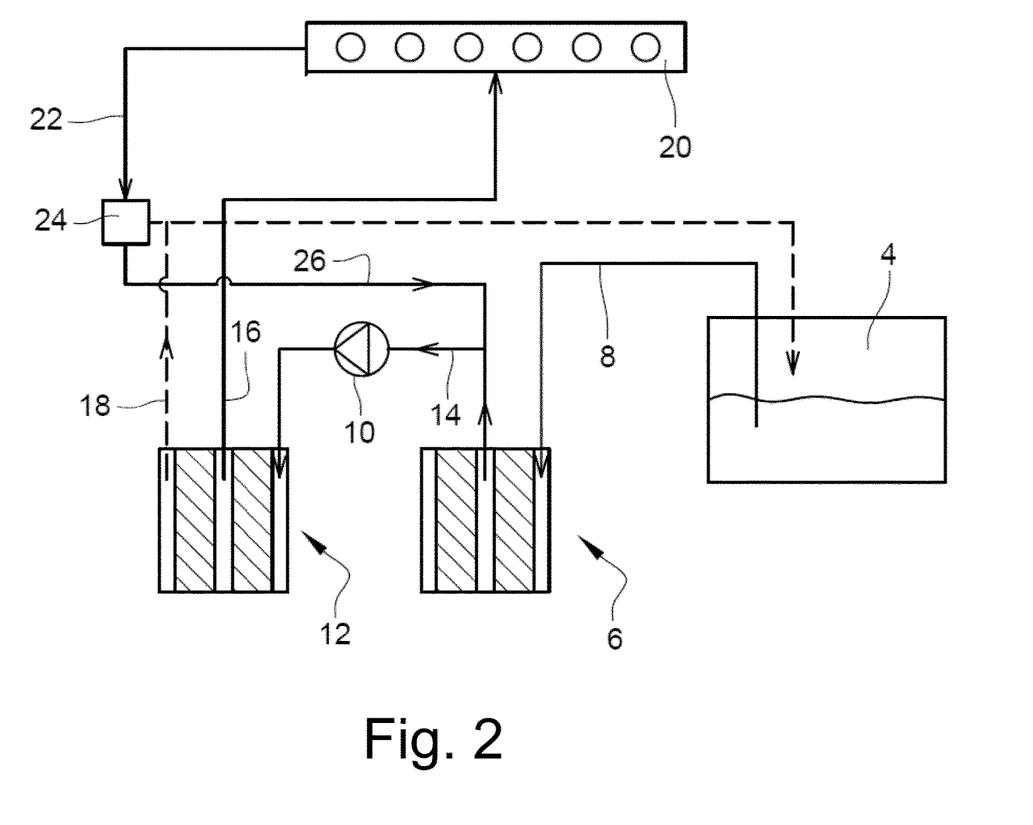
FIG. 2 is a scheme of the internal combustion engine arrangement of the vehicle of FIG. 1, comprising a main filter and a pre-filter, which can be considered as a first, respectively a second embodiment of the invention.

Typically, the fuel tank 4 is connected to pre-filter 6 by a line 8. Pre-filter 6 includes a tubular filter media through which the fuel flows from the outside to the inside in operation. This means that the unfiltered fuel arrives in a chamber around the filter media and flows through the media to reach the central chamber of the filter media. A pump 10, called "low-pressure pump", draws fuel from the outlet of pre-filter 6 through a line 14 and pump it to the inlet of the main filter 12.

The fuel escapes from filter 12 through a line 16 that carries it to the engine's injection system 20. Advantageously, the injection system 20 includes pump injectors, which draw fuel from the main filter 12 to the injection system 20, but alternatively, a pump, often called "high-pressure pump", could be used to pump the fuel from the filter 12 to the injection system 20.

The system also includes a line 22 to discharge the amount of fuel that was not burned during combustion. In practice, it is a fuel-gas mixture that comes out of the engine's combustion cylinders. Also, a separation valve 24 separates the liquid from the gases: The liquid flows to the suction line 14 of the low-pressure pump 10, while the gases return to the tank 4.

Figure 3:
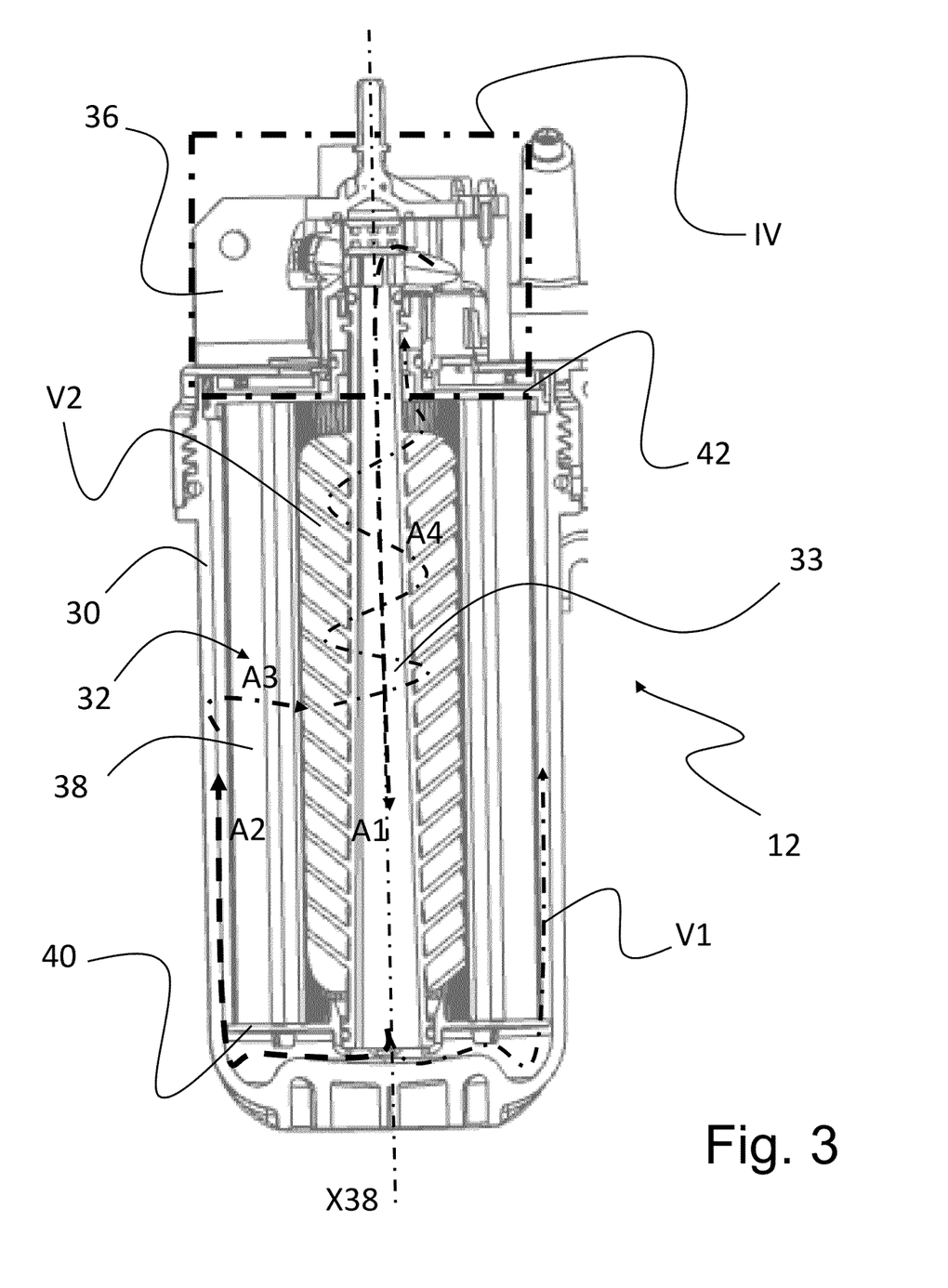
FIG. 3 is a sectional drawing of the main filter (first embodiment)

As shown in FIG. 3, Filter 12 includes a filter housing 30 inside which a filter element 32 (also known as "filter cartridge") is arranged. The filter housing 30, which is preferably made of plastic, defines a top opening.

The filter housing 30 is to be screwed below a filter head 36 (also known as "filter cover" or "filter casting"). Therefore, the filter head 36 is fixed above the filter housing 30 and closes off the top opening of filter housing 30. The housing 30 can be unscrewed from the filter head 36 from below, which makes it possible to remove the filter element 32 and, if necessary, replace it.

The filter head 36 is preferably made of Aluminium and also serves as a mounting bracket to fix the fuel filter 12 to the engine block.

In this paper, we consider that the filter 6 or 12 can be either of "cartridge construction" or of "spin-on construction". In the "cartridge construction", the filter housing 30 is a permanent housing and only the filter element, or cartridge 32, is replaced when necessary. In the "spin-on construction", the filter housing 30 and the filter element 32 form a self-contained housing and element assembly, which is to be unscrewed from the filter head 36, discarded, and replaced with a new one.

Filter element 32 comprises a tubular filter media 38, arranged between two parallel plates 40 and 42. The filter media 38 defines a central axis X38 (or revolution axis). Filter media 38 is, in a way known per se, made from a pleated sheet.

By its tubular shape, filter media 38 defines an internal volume, or central volume V1 and an external volume V2, which includes the volumes above, below and around the media 38.

The plate 42 is known as the "top end plate" since it is located in the upper part of the filter in use configuration, while the plate 40 is known as the "bottom end plate", for the same reasons. Plates 40 and 42 are made of a liquid-impermeable material.

In the example, the two plates 40 and 42 are disc-shaped and have a maximum (or outer) diameter that is approximately equal to that of filter media 38.

The filter element 32 also includes a central tube 33 (also known as "center tube") arranged coaxially in the centre of the filter media 38, which means that the central axis X38 of the media 38 is superimposed with that of tube 33. In the example, the inner volume of the central tube 33 forms an inlet path for the liquid to be filtered.

In the example, the wall of tube 33 is full, meaning that the tube 33 does not include any radial hole. In operation, the liquid contained inside the tube 33 can then not escape radially to the outside of the tube.

During operation, fuel flows radially through the filter media 38 from the outside to the inside. This means that the filter housing 30 delimits a first volume V1 for receiving a flow of liquid to be filtered, said first volume V1 being delimited radially around the filter medium 38 and a second volume V2 for receiving a flow of filtered liquid, said second volume V2 being delimited radially inside the filter medium 38.

The top plate 42 comprises a liquid passage opening 60 (See FIG. 4) that communicates with the second volume V2. This means that, during operation, the filtered liquid contained inside the filter media 38 can escape upwards directly through the top plate opening 60 to the channel 16.

Figure 4:
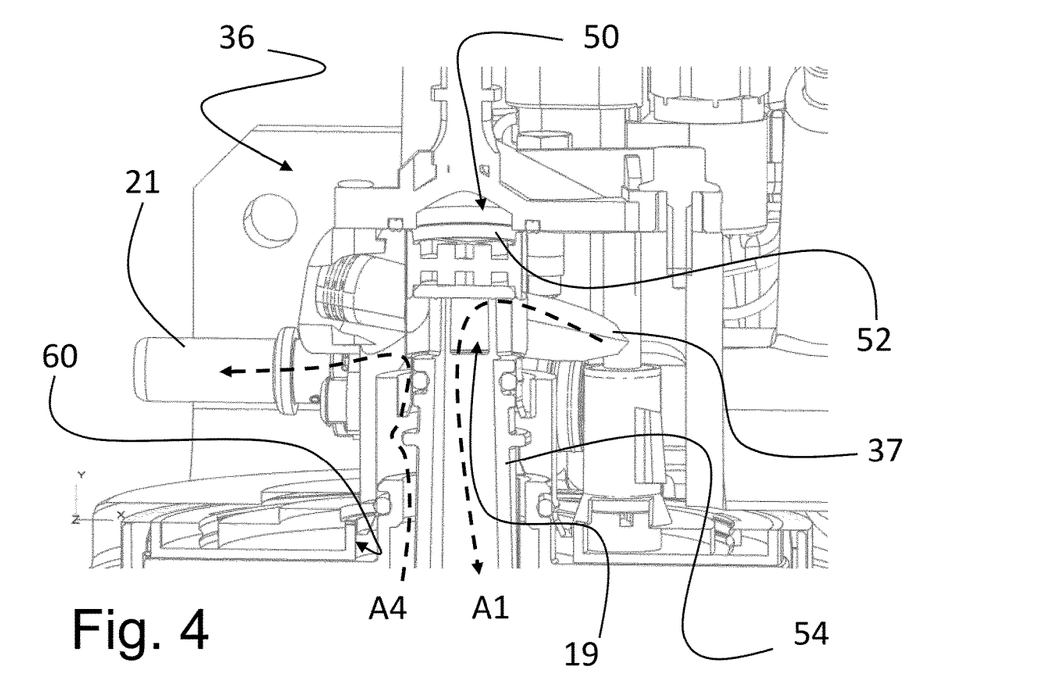
FIG. 4 is an enlarged view according to box IV of FIG. 3, in which the anti-leakage valve of the main filter is opened.
Figure 5:
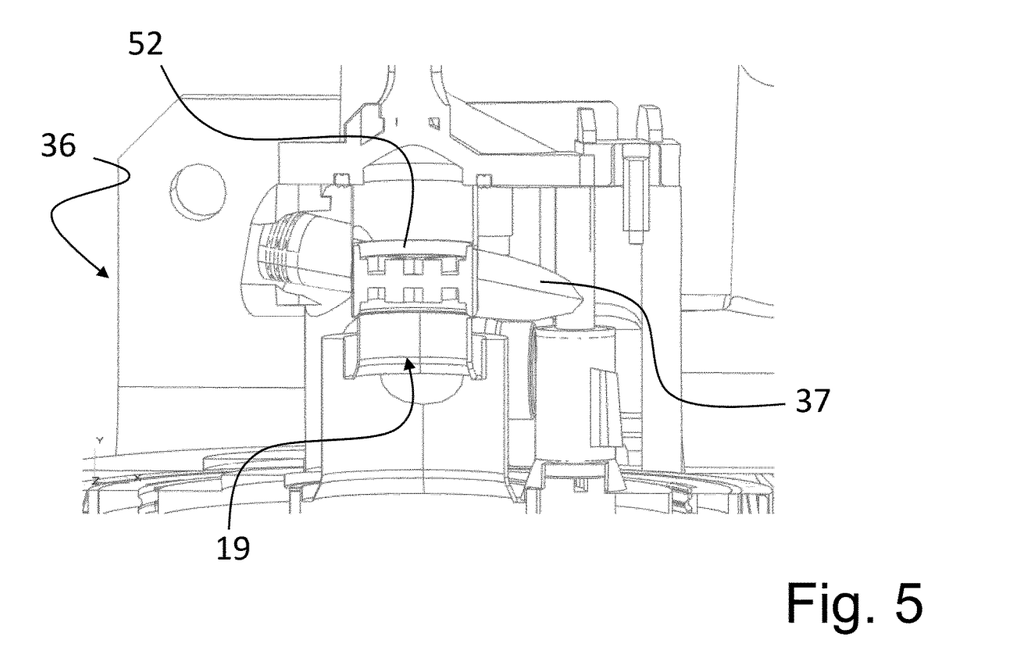
FIG. 5 is a view comparable to that of FIG. 4 wherein the filter housing has been removed from the filter head and wherein the anti-leakage valve has switched into a closed position.

The filter head 36 delimits an inlet port (also known as "inlet hole" or "inlet opening") 19 that is particularly visible on FIG. 5 and an outlet port 21 particularly visible on FIG. 4. In this document, and in accordance with the common definition, a "port" or an "orifice" does not necessarily have to be interpreted as a hole of circular cross-section, it is more generally an opening, whatever its shape.

The inlet port 19 communicates with the first volume V1, while the outlet port 21 communicates with the second volume V2.

In FIGS. 3 and 4, the dashed-line arrows A1, A2, A3 and A4 represent the passage of liquid in normal operation.

The central tube 33 and the bottom plate 40 are connected to each other in such a way that, in operation, liquid escapes through the bottom plate 40 to the outside of the filter media 38.

In the example, the center tube 33 and the bottom plate 40 are two distinctive parts. The central tube 33 is sealedly connected to a hole of the bottom plate 40.

In this paper, and according to the general definition, the fact that the tube 33 is "connected" to the bottom plate 40 does not necessarily mean that the tube 33 and the plate 40 are made of two different pieces: In a variant not shown, the central tube 33 could be integral with the bottom plate 40 (i.e. in one single piece).

The top plate 42 defines a central opening forming an outlet path for the filtered liquid. This central opening opens to the central volume of the media 38. In other words, the top plate central opening is in direct communication with the internal volume of the filter media 38, i.e. the filtered liquid inside the media 38 can escape directly upwards through the top plate opening.

Also, the central tube 33 is radially set back from the inner wall of the filter media 38.

In the example, the central tube 33 is fixed, in particular clipped, to one of the two plates 40 and 42, in particular to the bottom plate 40.

Advantageously, the central tube 33 passes through the top plate 42, i.e. the central tube 33 is received inside the opening of the top plate 42, so that the filtered liquid passes between the tube 33 and the top plate opening, and tube 10 protrudes upwards compared to the rest of filter element 32.

During operation, and as shown in FIG. 3, the fuel to be filtered enters the filter housing 30 through radial hole(s) extending through the center tube 33. The fuel then flows through the entire length of tube 33 (Arrow A1). The fuel then passes through the bottom plate 40 through the sealed connection between tube 10 and plate 8, flows up by the sides of the media 38 and accumulates in the volume around the filter media 4 (Arrow A2). The fuel then passes through the filter media 38 in a substantially radial direction to the central axis X38 of the media 38 (Arrow A3). The fuel, then filtered, flows up along the central tube 33, passes through passage sections between tube 33 and the top plate opening and joins an outlet channel (not shown) extending through the filter head 36 (See arrow A4).

In the example, the center tube 33 has fins that drive the fuel flow in a helical direction (See arrow A4 on FIG. 3) around the centre axis X38. This has the advantage of guiding the flow of filtered fuel to the top and creating a dynamic flow behaviour. In other words, this enables avoiding that the fuel flows downwardly and accumulates in the lower portion of the filter.

Typically, and as shown on FIG. 4, the liquid to be filtered enters inside the filter housing 30 through a central passage and that the fileted liquid flows out of the filter housing 30 through a central passage as well. Typically, the outlet passage is coaxially arranged around the inlet passage.

As shown on FIGS. 4 and 5, the filter head 36 is specific in that it includes an anti-leakage valve 50 (also known as "inlet valve") comprising a closing element 52 that is movable between a closed position (represented on FIG. 5) in which it closes off the inlet port 19 and an open position (represented on FIG. 4) in which the liquid can flow through the inlet port 19.

In the example, and as it is usual for this type of valve, the closing element 52 of valve 50 cooperates with a valve seat. This valve seat is part of the filter head 36.

Advantageously, the valve seat is made of rubber, which avoids using an additional seal ring.

Besides, the filter 12 further includes a pin 54 that is fitted on the filter element 32 and that is configured to penetrate inside the inlet port 19 so as to move the closing element 52 from the closed position to the open position.

Precisely, the closing element 52 is movable axially, i.e. along a direction that is parallel to axis X38. The closing element 52 is by default closing the inlet port 19 under the effect of gravity. When the pin 54 penetrates into the inlet port 19, it pushes the closing element 52 up, which uncovers a passage for liquid through the inlet port 19. When the filter housing 30 is dismounted, the pin 54 moves out of the inlet port 19 and the closing element 52 moves back into the closed position under the effect of gravity. Accordingly, valve 50 stops the inlet flow of fuel through the inlet port 19, meaning that no fuel drops onto the floor or onto the operator while the filter element 32 is replaced.

In the example, the closing element 52 is a plunger (or piston).

Typically, the pin 54 is arranged at the centre of the top end plate 42. In the example, the pin 54 extends axially upwards. It protrudes upwards relative to the rest of the filter element 32.

In the example of the figures, and although this is not properly shown, filter head 36 includes another outlet channel (not shown) communicating with the return line 18. A degassing valve is preferably included in said other channel. As its names indicates, the degassing valve opens to let the gas (typically air) inside the filter housing to flow back to the fuel tank and is closed off as soon as the filter housing is filled up with liquid. As such degassing valve is well known from prior art, it is not described in further details.

In the embodiment of the figures, the filter head 36 delimits an inlet channel 37 arranged upstream of the inlet port 19.

Thanks to this anti-leakage valve 50, the inlet port is automatically closed when there is no filter element 32, because the closing element 52 is by default closing the inlet port 19. Accordingly, if there is no filter element 32, then no fuel will flow through the inlet port 19 and the liquid filter 12 will not be supplied with fuel. The engine will be able to start. However, it will automatically stop after a short time period due to lack of fuel supply. The same defect could be observed if the filter element that is in the system (i.e. that is in the filter housing 30) is not designed for this specific application (i.e. if the filter element is not provided with a pin 54). This is called "No filter No run".

In one non-represented alternative embodiment, the filter head 36 delimits another outlet port (not shown) and a bypass (not shown) extending between the inlet channel 37 and said other outlet port. In that case, the closing element 52 is arranged so that it closes off the bypass in the open position (FIG. 4) and so that the bypass is open as long as the closing element is in closed position (FIG. 5).

Figure 6:
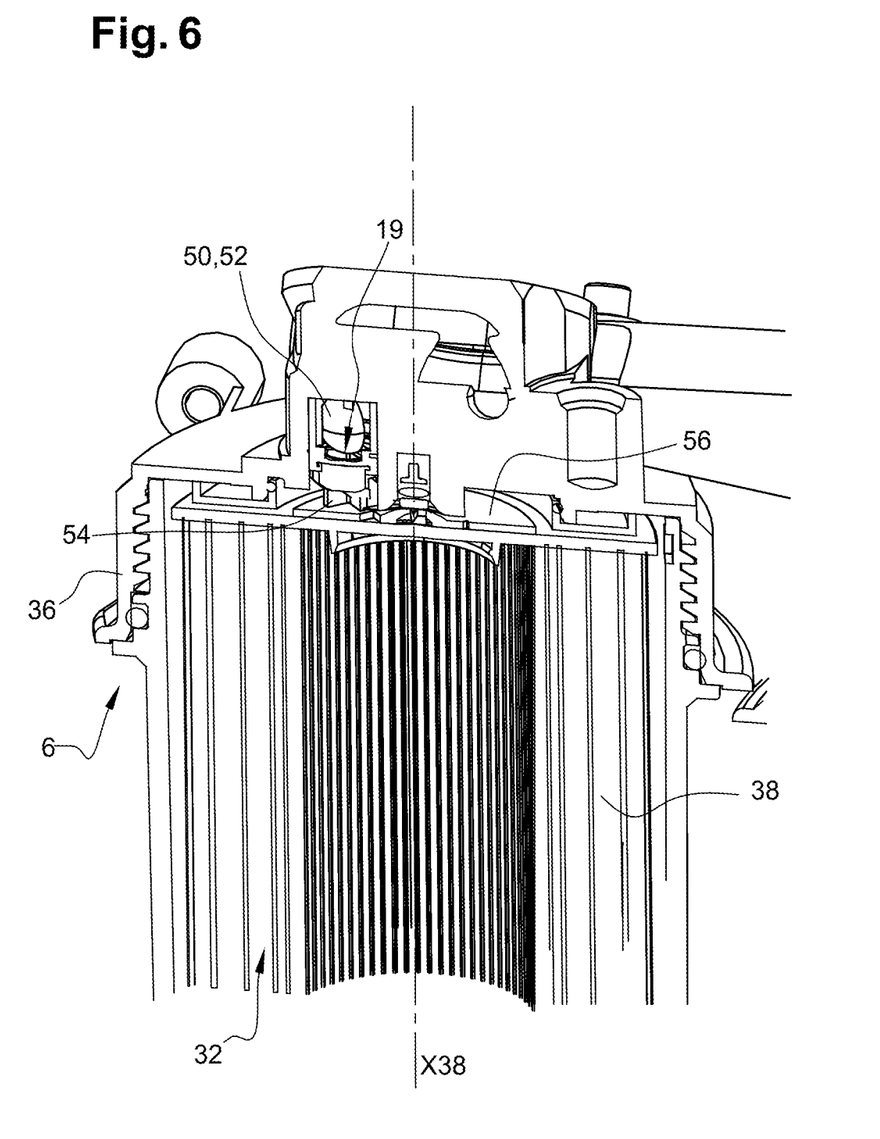
FIG. 6 is a sectional drawing of the pre-filter (second embodiment)
Figure 7:
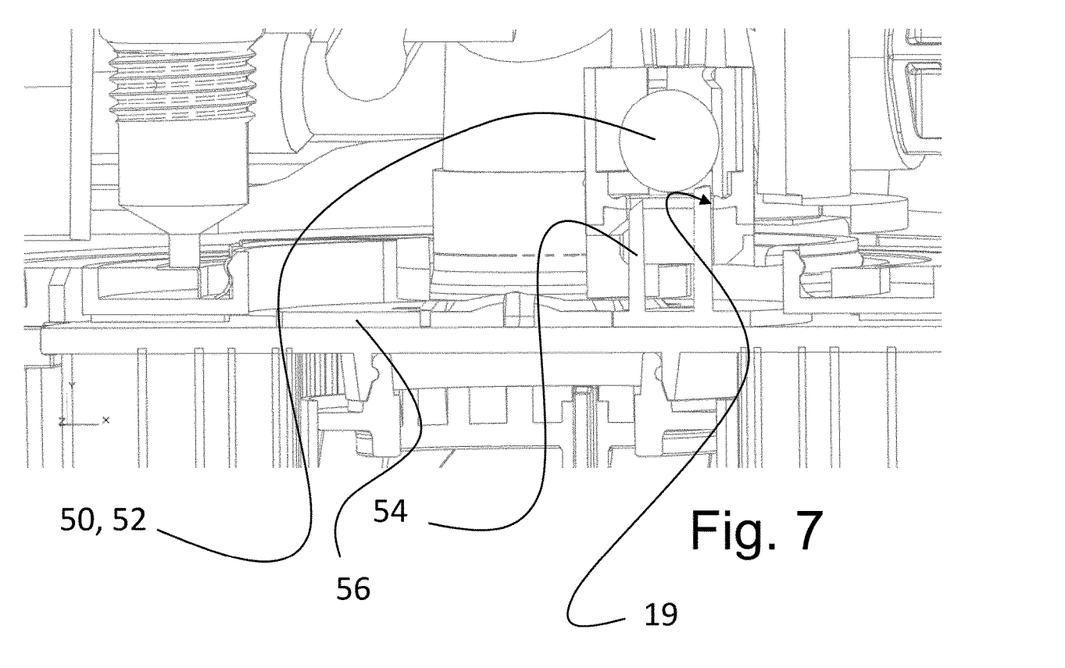
FIG. 7 is a detailed representation of the anti-leakage valve of the pre-filter, in which said anti-leakage valve is open.
Figure 8:
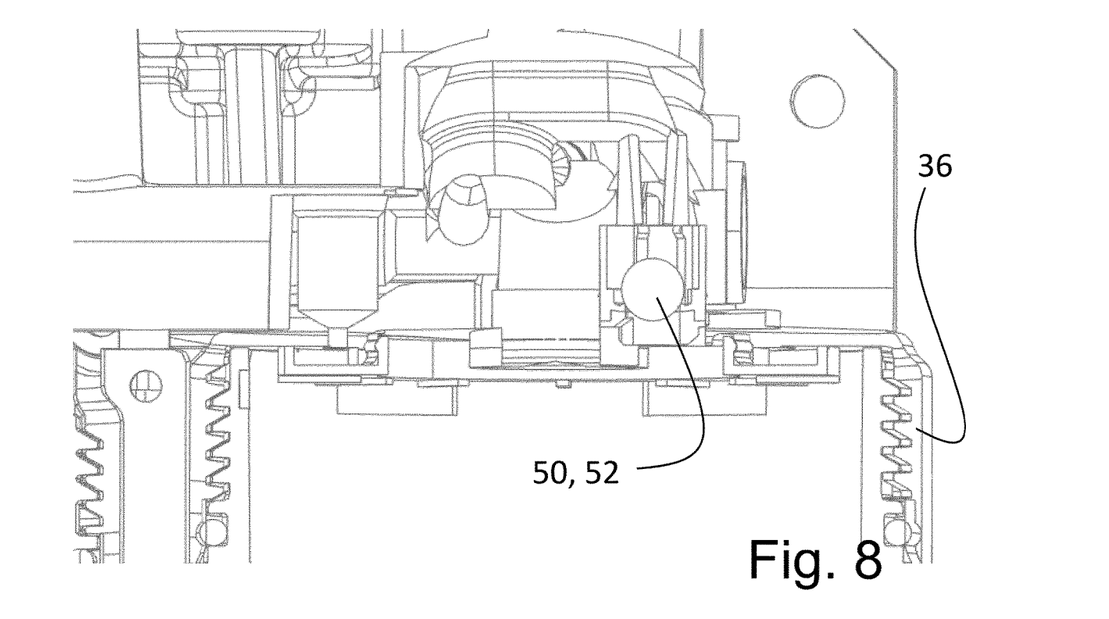
FIG. 8 is a view comparable to that of FIG. 7 wherein the filter housing has been removed from the filter head and wherein the anti-leakage valve has switched into a closed position.

FIGS. 6 to 8 represent the pre-filter 6, which can be seen as another embodiment of the invention. Only the differences relative to the main filter 12 are depicted here-below, for concision purpose.

A first difference between the pre-filter 6 and the main filter 12 is that the pin 54 fitted on the filter element 32 is arranged eccentrically with respect to the central axis X38 of the filter medium 38.

Another difference is that the closing element 52 is a ball, preferably made of plastic.

In addition, the filter head 36 further includes indexing means 100 for guiding the pin 54 towards the inlet port 19 when screwing the filter housing 30 to the filter head 36, until the pin 54 reaches a configuration (i.e. an aligned configuration) in which it is axially aligned with the first port 19.

In the example, the filter element 32 is fixed in rotation with the filter housing 30 and the pin 54 is part of a ring 56 that is rotatably mounted on the top end plate 42 of the filter element 32. This means that the ring 56 is free to rotate relative to top plate 42. Preferably, the ring 56 is arranged coaxially at the top surface of the top plate 42. Typically, the ring 56 is clipped on the top plate 42. However, any other means can be used for attaching the ring 56 to the top plate 42.

In one non-represented alternative embodiment, the filter element 32 could be movable in rotation with respect to the filter housing 30. In that case, there would be no ring 56: The pin 54 would be part of the top end plate 42 of the filter element 32.

Figure 9:
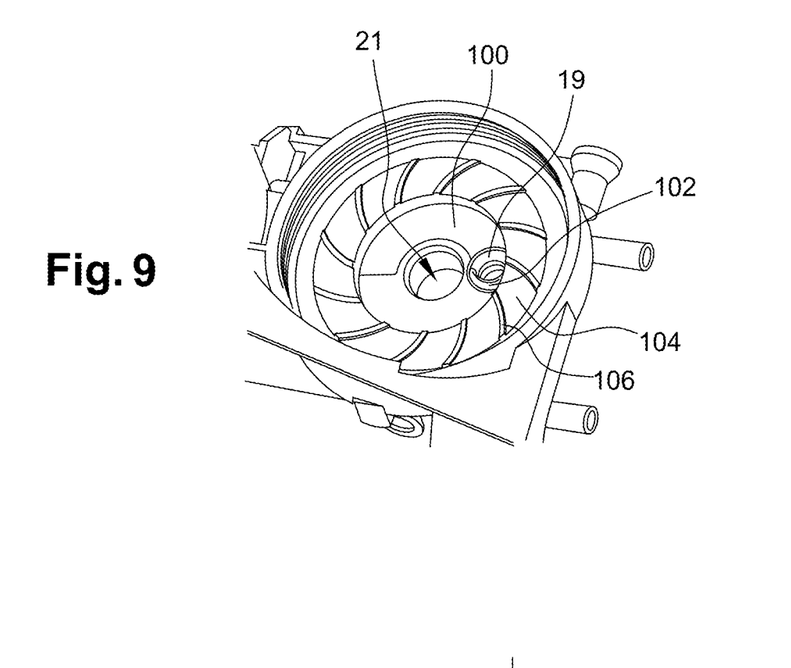
FIG. 9 is a bottom view of the filter head of the pre-filter.

As it can be derived from FIG. 9, the indexing means 100 include a guiding surface in the form of an elliptic surface. This guiding surface is inclined relative to a plane perpendicular to the central axis of the filter 12, i.e. axis X38. In other words, the guiding surface corresponds to the intersection of a tube with a plane that is not perpendicular to the central axis of the tube (inclined plane).

The guiding surface is designed for guiding the pin 54 towards the inlet port 19 when the filter housing 30 is assembled at the bottom of the filter head 36.

The indexing means 100 comprise a wall 102 fitted on the filter head 36 and extending substantially parallel to the longitudinal axis X38. The wall 102 forms an abutment configured to cooperate with the pin 54.

The wall 102 is a projection from the filter head 36 that cooperates with the pin 54 to put it and maintain it in the above mentioned aligned configuration. According to an aspect of the invention, the wall 102 is a profiled part extending substantially parallel to the longitudinal axis X38.

Typically, when the filter element 32 needs to be replaced, the operator proceeds firstly with dismounting it by unscrewing the filter housing 30 from the filter head 36. When the operator starts to unscrew the filter head 36, the rotating ring 56 remains immobile as the pin 58 is blocked in rotation because it is engaged in the inlet port 19 acting as a receiving hole. As soon as the pin 54 gets out of the port 19, it is no more blocked in rotation and rotates along with the filter element 32.

Afterwards, a new filter housing is mounted below the filter head. The filter housing 30 can be kept ("cartridge" design) or thrown away ("spin-on" design).

When the operator starts screwing the filter housing 30 around or inside the filter head 36, the pin 54 abuts against the guiding surface 100 of the filter head 36 (there is no need to orient the pin 54 exactly in front of the inlet port 19). Then, the screwing movement (which includes a rotation and a translation) forces the pin 54 to move along the guiding surface 100.

The pin 54 can move in the same direction that the screwing motion, or in the opposite direction, depending on the location at which it abuts against the filter head surface 100. Typically, if the pin 54 is close to the hole 19 but that the screwing rotation motion tends to move the pin away from the hole 19, then the inclined nature of the guiding surface 100 will prevent the pin 54 from moving in that direction and will force the pin 54 to move in the other direction and reach the hole 19. This is made possible thanks to the fact that the rotating ring 56 to which belongs the pin 54 can rotate relative to the top plate 42. Then, the pin 54 can rotate in one direction even though the top plate 42 rotates in the other direction.

It is therefore to be understood that the pin 54 is automatically oriented towards its final position during the assembly operation, meaning that the operator does not have to orient the filter element 32 in a way that the pin 54 penetrates into the inlet hole 19.

When the pin 54 reaches the hole 19, the ring 56 stops rotating. The filter housing 30, however, keeps turning until screwing motion is complete. By pursuing the screwing movement, the pin 54 is pushed inside the hole 19 to reach the position of FIG. 7.

One advantage to this specific filter design is that if one tries to replace the filter element 32 by a filter element of a different design, then the valve 50 would remain closed and no fuel would flow in the filter housing 30. Accordingly, this special design ensures that the engine will not run if an inappropriate filter element (or if no filter) is assembled inside the housing 30: This safety feature is called "No filter, No run", as mentioned above.

Figure 10:
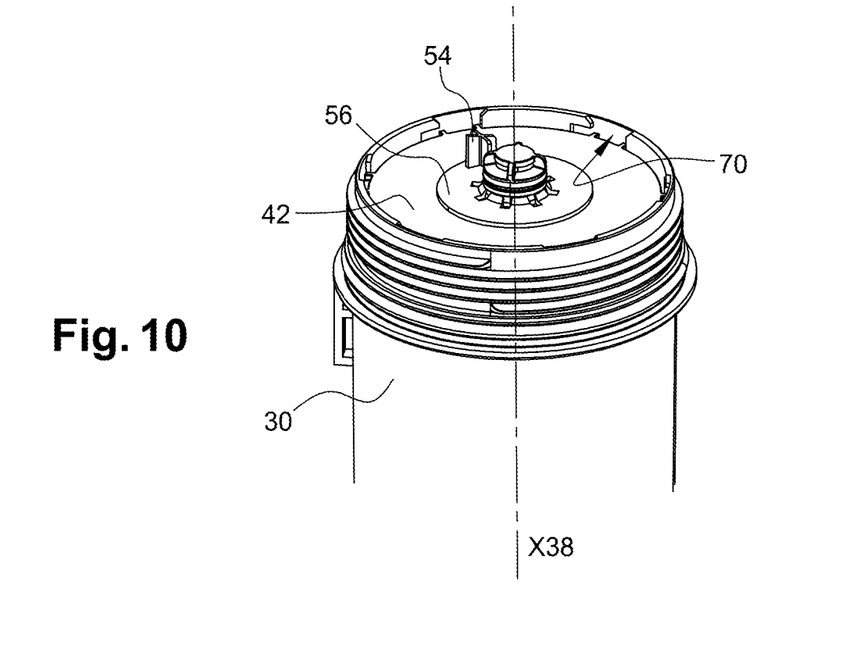
FIG. 10 is a perspective view of the filter housing of the pre-filter.

In connection with FIG. 10, the filter element 32 can be rotated inside the filter housing 30 between a first configuration (not represented) in which it is held axially within the filter housing 30 and a second configuration (represented on FIG. 10) in which it can be axially removed from the filter housing 30.

Typically, the filter element 32 is attached to the filter housing 30 using a bayonet mounting system. Such bayonet mounting system includes at least one L-shape locking groove, preferably several locking grooves 70 provided on the radial internal surface of the filter housing 30 and at least one complementary radial tooth, preferably two complementary radial teeth provided on the radial external surface of the filter element 32. Said two radial teeth can be seen on FIG. 10.

This bayonet mounting system is particularly advantageous in a configuration in which only the cartridge needs to be replaced (cartridge construction). Indeed, after having removed the filter housing from the filter head, the operator firstly empty the housing from remaining fuel in a first dedicated trash (not shown) and secondly move the filter cartridge with respect to the housing to bring in the second configuration (of FIG. 10). Then, the operator can simply remove the filter cartridge from the housing by simply orienting the filter housing opening to the ground: The filter cartridge slides out of the housing with gravity into a second dedicated trash (not shown). This enables recycling both the fuel and the cartridge, which is more ecologic than actual processes.

In a variant not shown, clipping means can be used instead of the bayonet mounting system to attach the filter element 32 inside the filter housing 30. Typically, the filter element 32 would include one or more clips which engage inside corresponding recesses delimited on the filter housing 30. Once the filter housing 30 is disassembled from the filter head 36, the operator can easily separate the filter element 32 from the housing 30 using a screwdriver or the like to unclip the filter element 32 from the filter housing 36.

Preferably, the filter head 36 includes an anti-spillage ring 104 arranged coaxially around the guiding surface. This anti-spillage ring 104 enables to fill in the dead volume between the filter head 36 and the filter cartridge 32: Accordingly, when the filter housing 30 is removed from the filter head 36, the fuel trapped between the anti-spillage ring 104 and the filter cartridge 32 drops into the filter housing 30, which means that there is no fuel spillage once the filter housing 30 is disassembled.

Preferably, the anti-spillage ring 104 is provided with ribs 106 that stiffen the structure of it.

In this embodiment, and as for the main filter 12, the outlet port 21 is arranged at the center of the filter head 36, meaning that filtered liquid flows out of the liquid filter by the center of the filter.

In a variant not shown, the filter housing 30 would be screwed by the top on the filter head 36, meaning that in the assembled configuration, the filter head 36 is below the filter housing 30. In this embodiment, a return means, such as a spring, would be used to push the closing element 52 upwards and maintain it in the closed position.

As goes without saying, the invention is not limited to the embodiments described above by way of example, it encompasses all the variants.

It is to be understood that the present invention is not limited to the embodiments described above and illustrated in the drawings; rather, the skilled person will recognize that many changes and modifications may be made within the scope of the appended claims.

The invention claimed is:

1. A liquid filter for a vehicle, said filter comprising:
a filter head delimiting an inlet port and an outlet port;
a filter housing which is to be screwed below the filter head and which contains a filter element centered on a central axis, said filter element including a filter medium, a top end plate and a bottom end plate,
wherein the filter housing delimits a first volume for receiving a flow of liquid to be filtered, said first volume being delimited radially around the filter medium and communicating with the inlet port and a second volume for receiving a flow of filtered liquid, said second volume being delimited radially inside the filter medium and communicating with the outlet port; wherein the filter head includes an anti-leakage valve comprising a closing element that is movable between a closed position in which it closes off the inlet port and an open position in which the liquid can flow through the inlet port and in that the filter further includes a pin that is fitted on the filter element and that is configured to penetrate inside the inlet port so as to move the closing element from the closed position to the open position, wherein the pin comprises a hollow interior, the hollow interior being in fluid communication with the inlet port when the closing element is in the open position to allow the flow of the liquid through the inlet port.

2. Filter according to claim 1, wherein the filter head further includes indexing means for guiding the pin towards the inlet port when screwing the filter housing to the filter head, until the pin reaches a configuration in which it is axially aligned with the inlet port.

3. Filter according to claim 2, wherein the filter element is fixed in rotation with the filter housing and in that the pin is part of a ring that is rotatably mounted on the top end plate of the filter element.

4. The filter according to claim 1, wherein the filter element is movable in rotation with respect to the filter housing and in that the pin is part of the top end plate of the filter element.

5. Filter according to 1, wherein the pin is arranged eccentrically with respect to the central axis.

6. The filter according to claim 1, wherein the pin is arranged at the center of the top end plate.

7. The filter according to claim 1, wherein the pin extends axially upwards.

8. The filter according to claim 1, wherein the closing element is a ball or a plunger.

9. The filter according to claim 1, wherein the filter element can be rotated inside the filter housing between a first configuration in which it is held axially within the filter housing and a second configuration in which it can be axially removed from the filter housing.

10. The filter according to claim 9, wherein the filter element is attached to the filter housing using a bayonet mounting system.

11. The filter according to claim 1, wherein the closing element is by default maintained in closed position by gravity and automatically returns to this closed position by gravity when the pin is removed from the inlet port.

12. A vehicle, wherein it includes a liquid filter according to claim 1.

13. The filter according to claim 1, wherein the anti-leakage valve is an integral part of the filter head.

* * * * *